Jan. 24, 1950         G. E. HANSELL        2,495,326
TUNING INDICATOR AND TUNING CONTROL
Filed Dec. 5, 1945        3 Sheets-Sheet 1
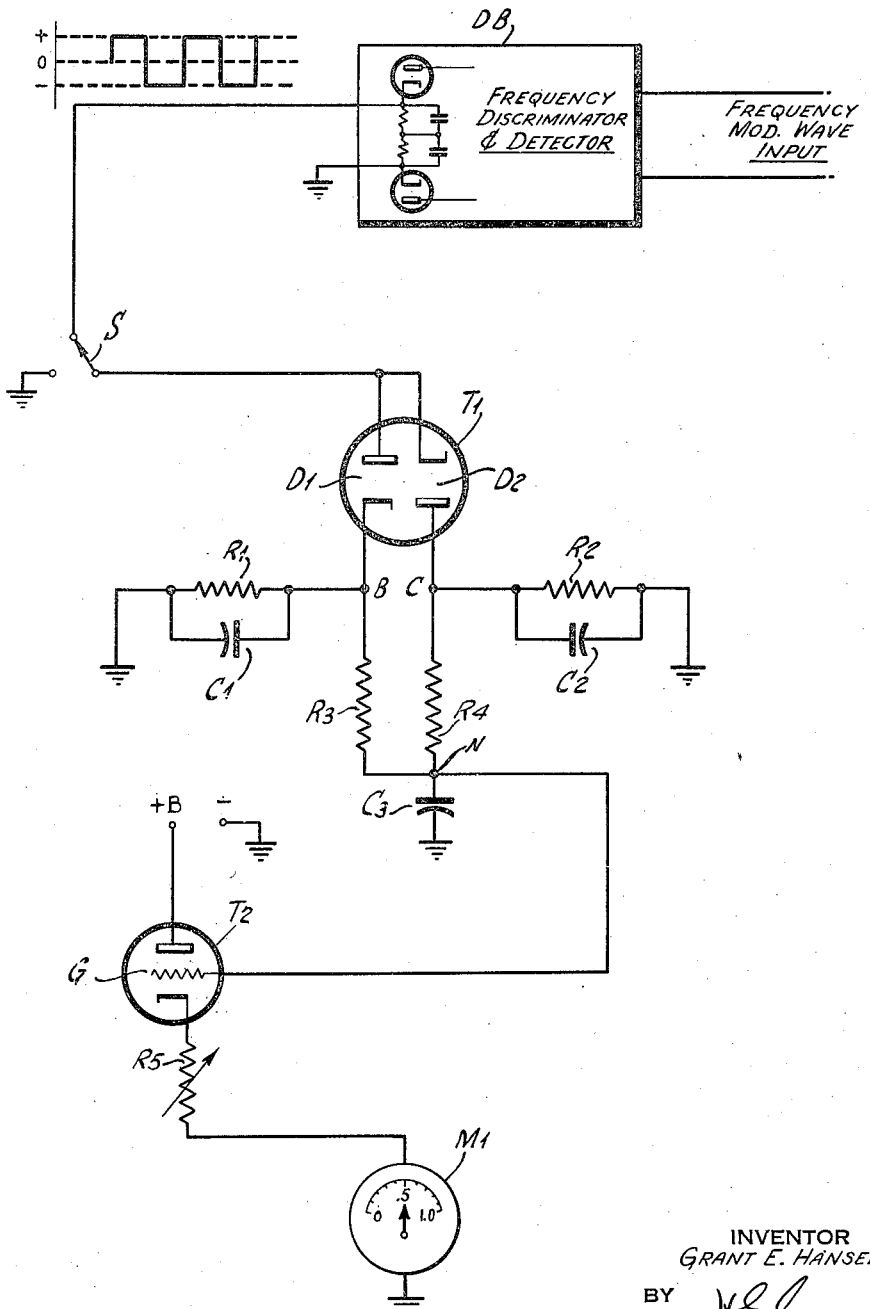
INVENTOR
GRANT E. HANSELL
BY
ATTORNEY Jan. 24, 1950 G. E. HANSELL 2,495,326
TUNING INDICATOR AND TUNING CONTROL
Filed Dec. 5, 1945 3 Sheets-Sheet 2
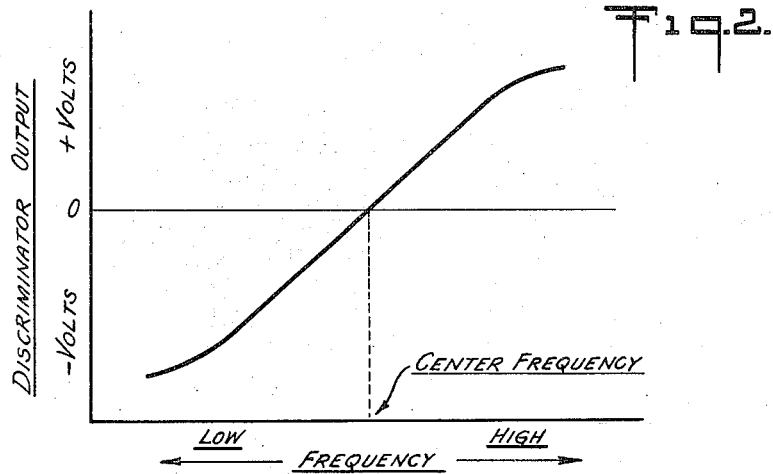
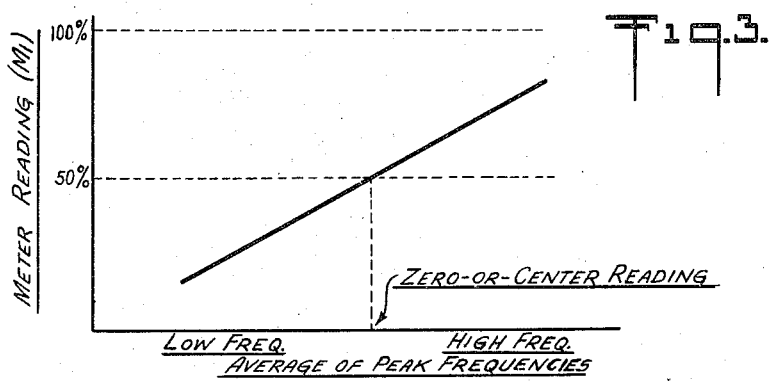
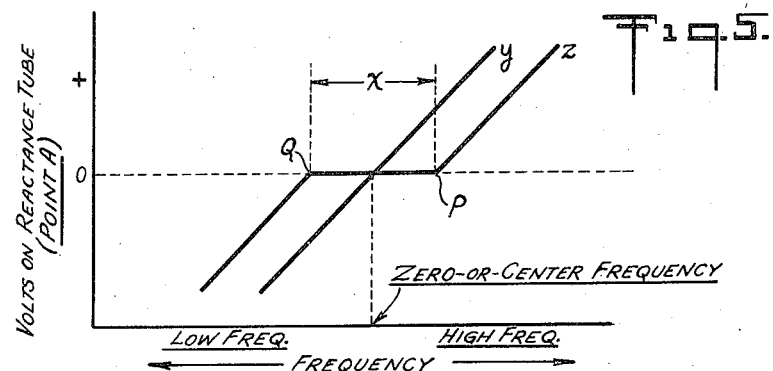
INVENTOR
GRANT E. HANSELL
BY
ATTORNEY

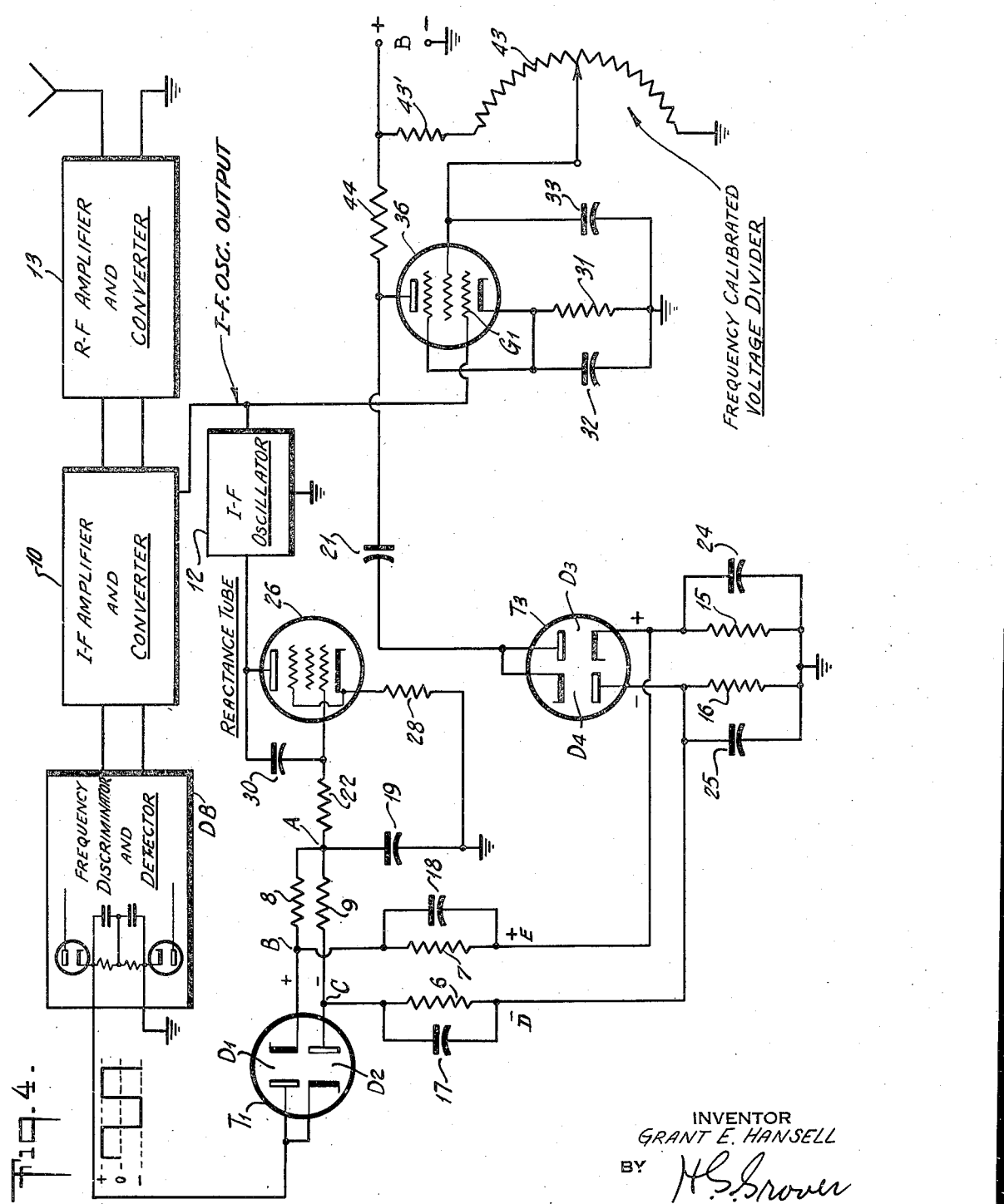

Patented Jan. 24, 1950

2,495,326

UNITED STATES PATENT OFFICE 2,495,326

TUNING INDICATOR AND TUNING CONTROL

Grant E. Hansell, Riverhead, N. Y., assignor to Radio Corporation of America, a corporation of Delaware Application December 5, 1945, Serial No. 632,979

11 Claims. (Cl. 250—40)

This application relates to means for deriving potentials representing the condition of tuning of circuits and apparatus, and to a tuning indicator actuated by said potentials and to improved automatic frequency control means using said potentials for retuning a circuit when necessary. The application is particularly applicable to use on frequency modulated signals and was in fact developed for use on frequency shift keying signals. A system utilizing the principles of my invention is disclosed in Schock et al. U. S. application Serial #632,978, filed December 5, 1945.

In frequency shift signalling, two currents of different frequencies separated by several hundred cycles are alternatively present. The currents are keyed to represent signals and they are usually keyed symmetrically about a center frequency. Obviously, since the frequency shifts back and forth the usual metering and automatic frequency control circuits are inadequate for use in the systems. An object of my invention is to provide an improved frequency tuning meter and automatic frequency control circuits for use in frequency shift signalling systems.

As stated above, the characteristics of the signals used in frequency shift systems are such that the usual center or mean frequency variation detecting means for detecting such variations are unsatisfactory, and a further object of my invention is to provide improved means for detecting such mean or center frequency variations, and for producing potentials characteristic of such variations in the mean frequency of the frequency shifted signals.

In describing my invention in detail, reference will be made to the attached drawings wherein Fig. 1 illustrates by circuit element and circuit connection the essential features of a device for detecting the state of tuning of a receiver excited by frequency shifted signals and a meter associated with said means for indicating the state of tuning.

Figs. 2 and 3 are curves used in describing the operation of the circuit arrangement of Fig. 1.

Fig. 4 illustrates by circuit connection and circuit element an automatic tuning control system arranged in accordance with my invention for stabilizing the tuning of circuits excited by or responsive to frequency shift signals while;

Fig. 5 (with Fig. 2) illustrates by curves operation of the arrangement of Fig. 4.

In Fig. 1 frequency shifted signals such as might be used in channel B of the diversity system described in U. S. application Serial #632,978, filed December 5, 1945, are fed to a frequency discriminator and detector DB, which may also be substantially as illustrated in said application. The discriminator and detector supplies at its output, current having a direct current component which when the system is properly tuned shifts back and forth about substantially zero potential as indicated adjacent the lead running from the detector to the double diode T1. As long as the frequency shifted current supplied to DB has a center frequency corresponding to the crossing point of the discriminator characteristic which may be substantially as illustrated in Fig. 2 of the drawings, the pulsating output is symmetrically related to about zero potential. The tube T1 comprises two diodes in a full wave peak rectifier circuit. The diode D1 has as its output load impedance a resistor R1 shunted by a condenser C1, while the diode D2 has as its output load impedance a resistor R2 shunted by a condenser C2.

The potential drops developed at points B and C due to rectification of the input wave are fed by resistors R3 and R4 respectively to the control grid G of a cathode follower stage including tube T2. The tube T2 has its anode connected to the positive terminal of a direct current source the negative terminal of which is grounded and has its cathode connected to ground through a cathode load resistor R5 and milliammeter MI. The tube T2 acts as a vacuum tube voltage meter of the cathode follower type. The rectifiers D1, D2 are peak rectifiers being connected so that the peak voltage is built up by the rectifier. D1 is a positive peak rectifier, D2 a negative peak rectifier.

When keying is impressed on the circuit points B and C each charges up to a voltage corresponding to the peaks of the keying. Point B becomes plus by the amount of the peak positive keyed voltage due to current flow in resistor R1 as smoothed by condenser C1. Point C becomes minus by the amount of the peak negative keyed voltage due to current flow in resistor R2 as smoothed by condenser C2. In other words, these resistors and condenser networks are such that the average of the direct current components in the diodes D1 and D2 represent average peak swings. Resistors R3 and R4 are made about equal. Thus, if points B and C are equal in voltage and opposite in potential then point N will be at zero potential, as will the grid G. If the keying is not centered on the discriminator DB characteristic the potential at point B or C will grow depending upon which direction the keyed wave is off-center. Then the potential at point N will grow in a corresponding manner to change the bias on the grid G. With no voltage on the input of tube T2 or point N the meter MI is adjusted to any reading by adjustment of the value of resistor R5. It is preferable to adjust the meter MI to mid-scale. This may be done by connecting the diodes to ground by switch S so that the potential at the point N is about zero. Then R5 is adjusted for center scale reading of MI. Now it can readily be seen that if the voltage at N grows plus in potential the tube T2 will pass more current and the meter reading will increase, whereas if the potential at the point N goes minus the current through tube T2 will decrease and the reading on the meter MI will decrease. I have found that the meter reading is quite linear with changes in potential at the point N. The meter may be calibrated in cycles off-tune with respect to the center frequency of the discriminator DB as shown by the curves in Fig. 3. Also the meter may be used as a visual indicator while tuning a signal to the center of the discriminator DB. Condenser C3 is added to provide a sufficiently long time constant so that the meter will not follow the keying or other modulation.

In the arrangement of Fig. 4 the double diode T1 is as in Fig. 1 excited by potentials at the output of a frequency discriminator and detector DB. The discriminator and detector may be coupled with an intermediate frequency amplifier and converter 10 cooperating with an intermediate frequency oscillator 12 which supplies the desired intermediate frequency output to the discriminator and detector DB. A radio frequency amplifier and converter 13 may precede the I. F. amplifier and converter 10. The intermediate frequency oscillator 12 may be automatically tuned as will appear hereinafter.

The diodes D1 and D2 operate as described above to produce at points B and C positive and negative potentials respectively corresponding to the peaks of the pulse energy at the output of the discriminator DB and at A (corresponding to point N of Fig. 1) a resultant potential which is zero when the discriminator center frequency is centered with respect to the frequency shifted wave and the output of the discriminator swings symmetrically about zero potential. The resistors R1 and R2 and condensers C1 and C2 of Fig. 1 are in Fig. 4 replaced by resistors 6 and 16, and 7 and 15, and condensers 17 and 25, and 18 and 24, connected as shown in the diode direct current circuits. The point A is connected to ground by a condenser 19 and by a resistor 22 to the control grid of a reactance tube 26. The reactance tube 26 has its cathode grounded by a resistor 28 and its anode coupled to its grid by a condenser 30. The condenser 30 and resistor 22 provide a phase shifting network which insures that the phase of the generated oscillations set up on the anode of the tube 26 by the oscillator 12 is in quadrature with respect to the phase of the oscillations impressed on the grid of this tube by the phase shifting network 22 and 30.

Output from the I. F. oscillator 12 in addition to being supplied to the intermediate frequency amplifier and converter 10 is supplied to the control grid G1 of a screen grid tube 36. The screen grid electrode of the tube 36 is supplied by potential through a potentiometer 43 in a voltage divider circuit including resistor 43'. The potentiometer 43 may be calibrated in cycles frequency shift as will be described hereinafter. The anode of the tube 36 gets positive potential through resistance 44 from the same source of direct current potential supplying the screen grid and is coupled by condenser 21 to a full wave rectifier system including a tube T3. The cathode of tube 36 is coupled to ground by a cathode bias resistor 31 shunted by a bypass condenser 32 to keep the cathode of tube 36 operating at the proper direct current potential. 33 is an I. F. bypass condenser. The full wave rectifier diode D3 and D4 circuits are completed by the resistors 15 and 16 connecting the cathode of diode D3 and the anode of diode D4 respectively to ground. These resistors are shunted by condensers 24 and 25. Condensers 24 and 25 are for the purpose of bypassing the resistors 15 and 16 for the intermediate frequency current being fed into tube T3 and for providing a time constant sufficient to cause diodes D3 and D4 to build up direct current voltage across resistors 15 and 16 equal to the peak of the diode input voltage. The condensers smooth out or remove alternating current components of intermediate frequency.

The discriminator and detector DB is again assumed to have a characteristic as illustrated in Fig. 2. When keying is impressed on the circuit of Fig. 4, points C and B charge up to a voltage corresponding to the peaks of the keying if points D and E are at zero potential. The voltages at points D and E depend on whether or not the full wave rectifier T3 is excited by output from the tube 36. This in turn depends upon the gain of the tube which is adjustable by the potentiometer resistor 43. By adjusting resistor 43 so that the screen grid is at zero potential or thereabout tube 36 is cut off and the potentials set up at the points D and E by full wave rectifier T3 are zero. The voltage at point A will then be as shown by curve Y in Fig. 5. In other words, if the frequency is centered in the discriminator the voltage at point A is zero, whereas if the frequency is high a plus voltage appears at A, and if low a minus voltage appears at A. These voltages may be used to drive a tuning control means such as, for example, a tuning motor, or as illustrated in Fig. 4, a reactance tube which is in the tuning circuit of the oscillator 12. Where a tuning motor is used it may vary a reactance in the oscillator circuit. A satisfactory motor tuning arrangement wherein the motor tuning is controlled in one direction for a plus voltage and in the other direction for a minus voltage is shown in Crosby U. S. Patent #2,380,947, dated July 24, 1945. Any other tuning motor arrangement which has similar characteristics may be used.

Now if the potentiometer 43 is adjusted so that the tube 36 amplifies, equal negative and positive voltages are set up at the points D and E respectively. Then the resultant voltage at the point A will be as shown in curve Z of Fig. 5, for a single frequency input to the discriminator not keyed the spacing X depending upon the magnitude of the voltages at the points D and E. If frequency shift keying is used the space X may be set equal to the total frequency shift, then if the frequency drifts in either direction while keying is present, it will be corrected by the reactance tube or motor in the usual manner. If the keying is interrupted and left on either mark or space nothing happens to the automatic frequency control circuit. If the frequency drifts in one direction it is immediately corrected or if it drifts in the other direction nothing happens as long as it stays in the region shown by X in Fig. 5.

The operation of the arrangement of Fig. 4 will now be given. Assume first that the tetrode 36 has its screening electrode potential reduced to a point so that no current is flowing therethrough, and the tube is cut off so that the potentials developed by rectifier T3 due to current flow through resistors 15 and 16 are zero at E and D. Then assume that a single frequency at the center of the characteristic of the discriminator circuit in DB is applied to the diode T1 so that no current flow takes place in diodes D1 and D2 and zero potentials are developed at B and C, and as a consequence at point A. If the frequency goes higher, i. e., drifts, current flow takes place in D1 and a positive potential will be developed at B. Then with plus volts at point B and zero or ground potential at D there will be a flow of current from B through resistor 8, resistor 9, resistor 6, resistor 16 to ground, and back through resistor 15 and resistor 7 to point B. Due to the voltage divider action of the circuit including the elements described point A will swing in the plus direction but will not go as far plus as point B because of the voltage divider action. If resistors 8 and 9 are large as compared to resistors 6 and 7 and 16 and 15 the voltage at the point A may be made about half the voltage at the point B. In a similar manner it can be seen that if the frequency of the single frequency wave applied to the discriminator DB drifts in the opposite direction or goes lower than the center of the discriminator characteristic then due to current flow in D2 a negative voltage is developed at the point C. This causes a flow of current from C through resistances 9 and 8, resistance 7, resistance 15 to ground, and through resistances 16 and 6 back to C. The resistances enumerated in this path are again a voltage divider between the points C and E and due to this voltage divider action the potential at the point A goes negative to an amount which may be about half the potential at the point C. By this operation then it will be seen that when the potentials at D and E are about zero the control potential deriving means has a characteristic as illustrated at Y in Fig. 5.

Now still assume that a single frequency wave is being applied to the discriminator and that it is centered on the discriminator's characteristic so that the potentials at B, C and A are about zero volts. But now assume that the tube 36 has become conductive and that the point D is made negative by a fixed amount, say K volts, and the point E is made positive by a like fixed amount, say K volts. Then the negative voltage at the point D tends to cause current to flow to the point B through resistor 6, resistor 9, resistor 8, resistor 7, resistor 15, resistor 16 and back to D, while the positive voltage at the point E tends to cause a current to flow through the same resistors in series in the opposite direction. By the voltage divider action described above, point B is biased (by positive voltage K at E and negative voltage K at D) to a positive potential slightly less than K, and point C is biased to a negative voltage slightly less than K. Under these conditions the potential at A cannot change until the voltages applied to the diodes D1 and D2 overcome these voltages at B and C (slightly less than K volts). For example, if the input frequency to the discriminator and detector DB goes higher no current flow can take place in D1 until the potential at B is overcome. This could take place at point P, Fig. 5. Then a current flows as described above through the voltage divider including resistors 7, 8, 9 and 6 to increase the potential at point A.

The characteristic of the control voltage deriving means will be as shown by the curve Z of Fig. 5. In other words, there will be no change in potential at the point A until the potential at the input to diode D1 grows to an extent sufficient to overcome the potential produced at point B by the voltage applied at E due to the said voltage divider action. Now if the center frequency goes down a negative potential is developed at the diode D2 cathode but no current flow takes place until this input potential grows large enough to overcome the negative potential set up at C by the voltage applied at D. This might take place at point Q of Fig. 5, and by the above described voltage divider action taking place in resistors 6, 9, 8 and 7 a negative potential is produced at A which grows as the frequency of the currents applied to the discriminator goes down. In other words, under these conditions, if points B and C are biased to voltages slightly less than K volts the characteristic Z has a portion corresponding to the dimension X which is flat and at which zero control potential is produced at A. However, the points A, B and C will change in potential when the frequency of the wave at discriminator DB has changed an amount sufficient to develop an input voltage sufficient to overcome the effect of the voltage at E or D. The length of this flat portion of the characteristic may be increased or decreased by changing the voltage applied to the points D and E. These voltages may be increased or decreased by increasing or decreasing the gain of tube 36.

Now again assume that zero volts are applied at the points D and E and that the received signal is centered on the discriminator characteristic but is keyed so that a square wave keyed symmetrically about zero is applied to the diode full wave peak rectifier T1. Due to rectification in diodes D1 and D2 the point B will go plus by an amount commensurate with the keying in the plus direction and the point C will go minus by the same amount. Due to the divider action taking place in the resistors 8, 9, etc., a voltage of zero potential will be produced at the point A. The time constants of the networks (condensers 17, 18, 24, 25 and resistances 6, 7, 8, 9, 15, 16) are such that average direct current potentials depending on peak values of the keying potentials are developed at B and C. Then the system has a characteristic as indicated by curve Y of Fig. 5, and if the frequency drifts higher the potential at point B will go more plus and the potential at point C less minus and the divider action produces a plus voltage at point A which may be used as described hereinbefore to control a reactance tube or a motor for tuning purposes to thereby bring the system back into tune. In the embodiment illustrated this is accomplished by changing the simulated reactance of the reactance tube 26 and thereby retuning the intermediate frequency oscillator in 12 to change the center frequency to its assigned value. If the frequency drifts lower by similar action the potential at point A will become negative and tuning will be in the opposite direction.

Now again assume that a centered keyed wave is applied to the discriminator and that the points D and E are maintained at like negative and positive voltages respectively, resulting in point C being negative and B positive by say K volts. Also assume that the voltages at the discriminator output due to frequency shift keying are plus and minus K volts. Under these conditions no change will occur in the voltages at the points B and C, and point A will stay at zero potential. If the frequency of the wave drifts higher the positive part of the voltage fed to the diodes by DB will grow, rectification will take place in D1, and the potential at point B will grow or become more plus, and as a consequence the point A will go plus to retune the input to the discriminator. Conversely, if the center frequency of the wave applied to discriminator DB goes down the potential at point A will become negative. For this condition and for the condition in the preceding paragraph the voltage at the point A will follow the curve Y of Fig. 5.

To obtain this curve it may be readily seen that the voltages at D and E cannot be made greater than enough to produce voltages at B and C equal to the plus and minus voltages produced by the keying. From this it can be seen that the voltages at D and E may be calibrated for different amounts of frequency shift. The plus and minus keying voltages are proportional to the total frequency shift over the linear portion of the discriminator. Therefore, the potentiometer 43 which regulates the magnitude of the voltages at points D and E may be calibrated in cycles frequency shift so the operator may set up at points D and E voltages commensurate with the frequency through which the currents fed to discriminator DB are shifted.

The benefits derived from the arrangement are numerous and certain thereof will now be described. Assume that there is no voltage applied to D and E. Automatic frequency control action will be as desired while keying is present and mark and space frequencies will be on either side of the frequency on which the discriminator characteristic is centered. Now if the keying should stop on either mark or space the potential at A will change and retuning will take place in such a direction as to move the frequency which was mark or space frequency to the center of the discriminator characteristic. Now if keying is resumed it will be off-center by half the total swing and will remain off-center until the automatic frequency control can act to symmetrically relate the mark and space frequencies to the assigned proper center frequency so that they are spaced therefrom on opposite sides by equal frequency bands. This defect in systems known heretofore is overcome by putting the right amount of voltage at points D and E. Now when keying stops on either mark or space no retuning action takes place as long as the frequency stays within the flat portion of the curve Z of Fig. 5, and when keying is resumed it is more likely to be properly centered. In any event, it can be centered much faster than in systems which do not provide the compensating action described above. In other words, with the voltages on D and E the voltage at point A is represented by the curve Z when there is no keying, and by the curve Y when there is keying. A change is made from one curve to the other depending upon whether or not keying is present.

What is claimed is:

1. In apparatus for producing a low frequency potential which varies above and below zero potential when the center frequency of frequency shifted current varies in combination, a discriminator and detector with a load impedance excited by said frequency shifted current for deriving direct current potentials which vary relative to and about zero potential in a manner corresponding to variations in the center frequency of said currents, two rectifiers having electrodes connected to said impedance by direct current connections and excited in opposed polarity by said direct current potentials, a load impedance connected in series with the output electrodes of each rectifier, additional impedances conductively connected to the load impedances for deriving the algebraic sum of the potentials developed across said load impedances, and capacitors in shunt to said load impedances for suppressing current components of a frequency higher than said low frequency.

2. In a tuning meter for frequency modulated currents in combination, a discriminator and detector circuit for deriving in its output direct current components which vary relative to substantially zero potential in a manner corresponding to slow variations in the center frequency of said currents, a full wave peak rectifier connected to the output of said circuit to be excited by said direct current components and having output load impedances across which potentials of opposed polarity are developed, resistive means conductively connected to said load impedances for adding said opposed potentials algebraically to produce a resultant potential, and an amplifier stage of the cathode follower type having a control grid connected to said resistive means to be excited by said added potentials and having a current meter in the cathode circuit.

3. In apparatus for producing a potential which is constant in the presence of variations in the frequency of frequency shifted current within a band of frequencies which potential grows in absolute magnitude when said variations exceed said band of frequencies, in combination, a discriminator and detector circuit connected to be excited by said frequency shifted current for producing in its output direct voltages which vary relative to substantially zero potential in a manner corresponding to shifts in the frequency of said current, two rectifiers connected in opposed polarity in a rectifier circuit to the output of said circuit to be excited by said voltages, a load connected to the output of each rectifier to produce across said loads potentials of opposed polarity when rectification takes place, means for deriving the resultant of the potentials developed in said loads, and means for biasing said rectifiers to cutoff in the presence of produced direct voltages which are less than a selected absolute magnitude.

4. In signalling apparatus to be used with frequency shift currents, in combination, a discriminator and detector circuit connected to be excited by said current for deriving in its output direct current components which vary relative to substantially zero potential in a manner corresponding to variations in the center frequency of said currents, a full wave rectifier system connected to the output of said circuit to be excited by said direct current components, rectifier output loads across which potentials of opposed polarity are developed, means for biasing said rectifier system to cutoff in the presence of derived direct current components of a magnitude below a selected value, and means for deriving the resultant of the opposed potentials across said loads.

5. In apparatus for producing a potential which is constant in the presence of predetermined variations in the frequency of current shifted above and below a selected center frequency which potential grows in magnitude when said variations exceed a selected amount, in combination, a discriminator and detector circuit connected to be excited by said frequency shifted current for deriving in its output direct current potentials which vary relative to substantially zero potential in a manner corresponding to shifts in the frequency of said current, two rectifiers connected in opposed polarity in a rectifier circuit to the output of said circuit to be excited by said direct current potentials, a load impedance connected to the output of each rectifier wherein potentials of opposed polarity are developed when rectification takes place, means for deriving the algebraic sum of the potentials developed in said load impedances, and means for biasing said rectifiers to cutoff in the presence of derived direct current potentials which do not exceed a selected absolute magnitude.

6. In an automatic tuning control system to be used with frequency shifted current, in combination, a discriminator and detector circuit connected to be excited by said current for deriving in its output voltages which vary relative to zero potential in a manner corresponding to variations in the frequency of said currents, a full wave rectifier system connected to the output of said circuit to be excited by said voltages and having output load impedances across which potentials of opposed polarity are developed, means for biasing said rectifier system to cutoff in the presence of derived voltages of a magnitude below a selected value, resistive means conductively connected to said load impedances for adding said opposed potentials algebraically to produce a resultant potential, a tuner for controlling the frequency of said first current, and means connecting said tuner to said resistive means for controlling said tuner in accordance with said resultant potential.

7. In a signalling system to be used with frequency shifted current, in combination, apparatus including a converter and an oscillator for changing the frequency of said current, a discriminator and detector circuit coupled to said apparatus to be excited by said frequency shifted current of changed frequency for deriving in its output voltages which vary relative to zero potential in a manner corresponding to variations in the frequency of said currents of changed frequency, a full wave rectifier system connected to the output of said circuit to be excited by said voltages and having load impedances in its output across which potentials of opposed polarity are developed and having other impedances in which the opposed potentials are algebraically combined to produce a resultant potential, a reactance tube coupled to said oscillator for controlling the frequency of operation thereof, means connecting said tube to said other impedances for controlling said reactance tube in accordance with said resultant potential, means for biasing said rectifier system to cutoff in the presence of derived varying voltages of absolute magnitudes below a selected value, comprising a full wave rectifier system coupled to the output of said oscillator and having output loads wherein biasing potentials are developed, and a coupling between said loads and the rectifiers of said first mentioned full wave rectifier system.

8. In apparatus for producing a potential which varies above and below zero potential when the center frequency of frequency shifted alternating currents varies in combination, a discriminator and detector with an output impedance, connections for impressing currents shifted in frequency by signals above and below said center frequency on said discriminator whereby direct current potentials appear across said impedance which vary relatively to and about zero potential in a manner corresponding to variations in the center frequency of said currents, two rectifiers each having an anode and a cathode, a direct current conductive connection between said impedance and the cathode of one rectifier and the anode of the other rectifier, substantially equal current conductive impedances in series connected between the anode of said one rectifier and the cathode of the other rectifier at which impedances potentials are developed which are of opposed polarity and are a measure of the peaks of the frequency shifts of said alternating current with respect to said center frequency, connections for utilizing the differential of the potentials developed across said last-named impedances, and a capacitor in shunt to each of said load impedances for suppressing current components of repetition rate higher than the rate at which said developed potentials vary.

9. In apparatus for producing and utilizing a potential which varies above and below zero potential when the mean frequency of alternating current varies or drifts slowly in combination, a discriminator and detector with an output impedance, connections for impressing said alternating current on said discriminator whereby direct current potential, which varies relative to and about zero potential in a manner corresponding to variations in the mean frequency of said currents, appears across said impedance, two rectifier tubes each having an anode and a cathode, a direct current conductive connection between said output impedance and the cathode of one tube and the anode of the other tube, substantially equal impedances in series connected between the anode of said one tube and the cathode of said other tube, whereat opposed potentials are developed which are measures of the variations of the mean frequencies of said alternating current, a utilization circuit having input electrodes coupled to the junction point between said last named series impedances whereby the resultant of said opposed potentials fed to said utilization circuit, and connections for compensating said opposed potentials to delay production of said resultant potential until said mean frequency variations exceed a predetermined amount, comprising connections for applying a positive potential to the cathode of said other tube, and a negative potential to the anode of said one tube.

10. In apparatus for producing and utilizing a potential which varies above and below zero potential when the center frequency of frequency shifted alternating currents varies or drifts slowly in combination, a discriminator and detector with an output impedance, connections for impressing said alternating current shifted in frequency by signals above and below said center frequency on said discriminator whereby direct current potential, which varies relative to and about zero potential in a manner corresponding to variations in the center frequency of said alternating currents, appears across said impedance, two rectifier tubes each having an anode and a cathode, a direct current conductive connection between said output impedance and the cathode of one tube and the anode of the other tube, substantially equal impedances in series connected between the anode of said one tube and the cathode of said other tube whereat opposed potentials are developed which are measures of the peaks of the shifts of said alternating current, automatic tuning control apparatus connected to the junction point between said last named series impedances to control the frequency of said alternating current potentials in accordance with the resultant of said opposed potentials, and connections for compensating said opposed potentials to delay production of said resultant potential until said mean frequency variations exceed a predetermined amount, comprising connections for applying a positive potential to the cathode of said other tube, and a negative potential to the anode of said one tube.

11. In apparatus for producing and utilizing a potential which varies above and below zero potential when the center frequency of frequency shifted alternating currents varies or drifts in combination, a discriminator and detector with an output impedance, connections for impressing a current shifted in frequency by signals above and below said center frequency on said discriminator whereby direct current potential, which varies relative to and about zero potential in a manner corresponding to variations in the center frequency of said alternating currents, appears across said impedance, two rectifier tubes each having an anode and a cathode, a direct current conductive connection between said output impedance and the cathode of one tube and the anode of the other tube, substantially equal impedances in series connected between the anode of said one tube and the cathode of said other tube whereat opposed potentials are developed which are a measure of the peaks of the shifts of said alternating current, a source of oscillatory energy, apparatus including a reactance tube having an input electrode coupled to the junction point between said last named series impedances and said oscillator for controlling said center frequency, a second pair of rectifiers each having an anode and a cathode with the anode of one of said last pairs of rectifiers and the cathode of the other of said last pairs of rectifiers tied together and excited by energy from said oscillator, load impedances coupled with the cathode of said last one rectifier and the anode of said last other rectifier, and connections between said last load impedances and said substantially equal impedances for impressing thereon compensating potentials which prevent operation of said first named rectifiers for a selected range of frequency shifts about said center frequency.

GRANT E. HANSELL.

REFERENCES CITED

The following references are of record in the file of this patent:

UNITED STATES PATENTS

| Number | Name | Date |
|---|---|---|
| 2,267,453 | Foster | Dec. 23, 1941 |
| 2,333,990 | Dome | Nov. 9, 1943 |
| 2,377,327 | Seeley | June 5, 1945 |